Figure 7:
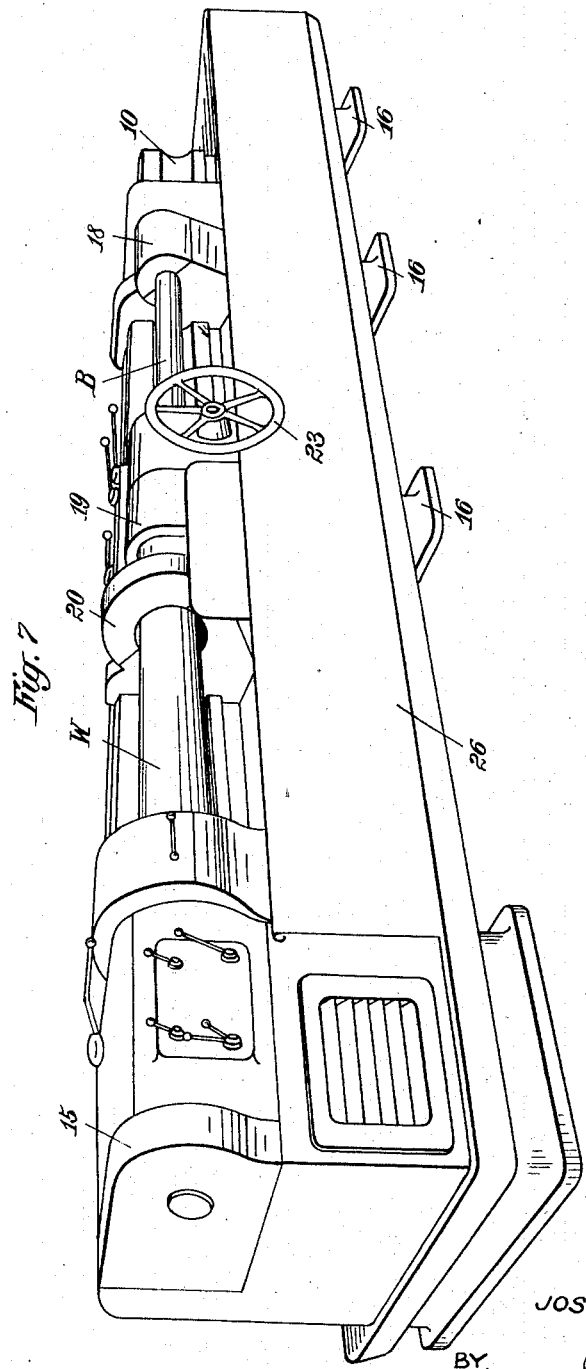

Dec. 30, 1941.  J. IRTENKAUF  2,268,214
BORING MACHINE
Filed Dec. 9, 1940  3 Sheets-Sheet 1
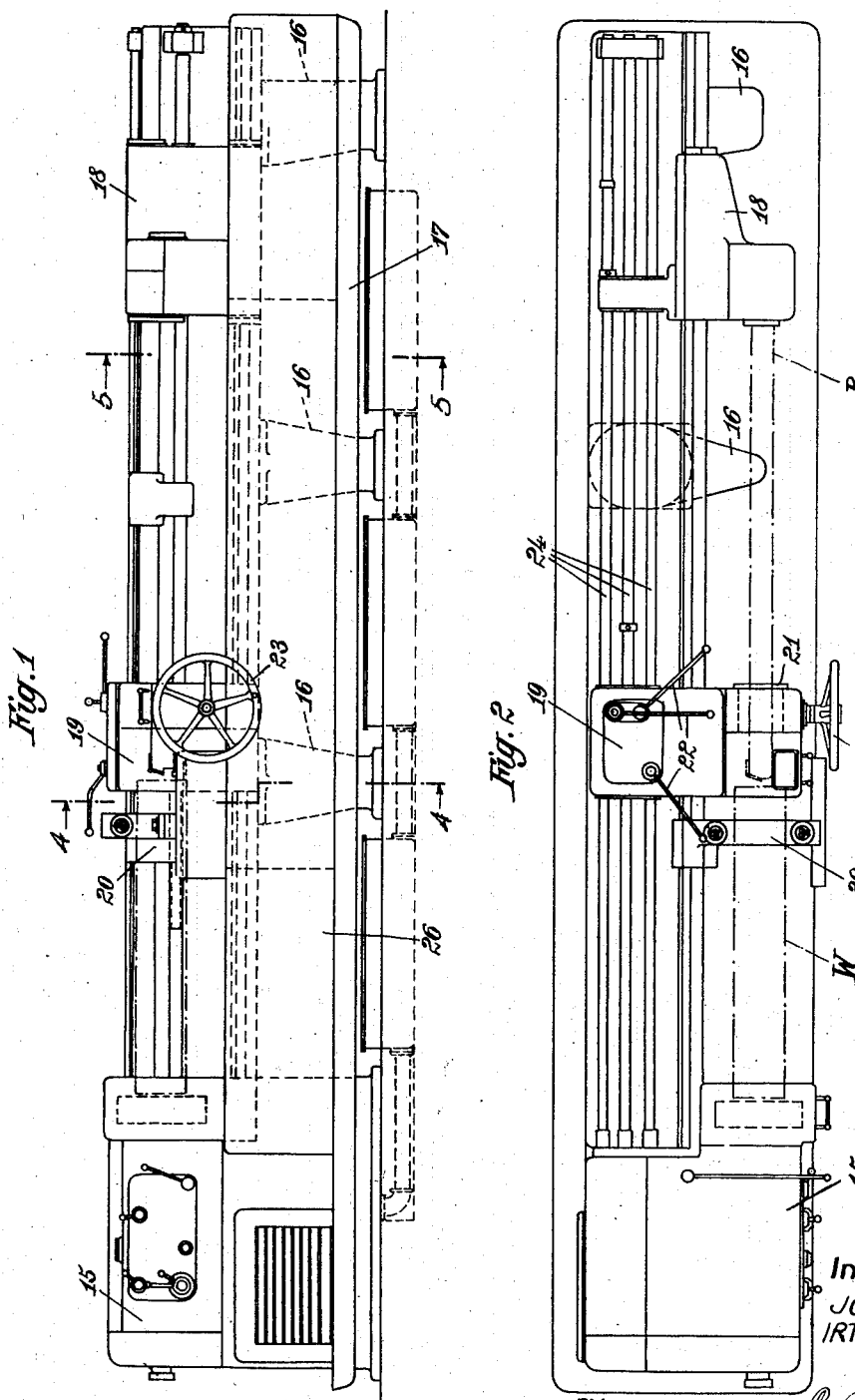
Inventor
JOSEF IRTENKAUF

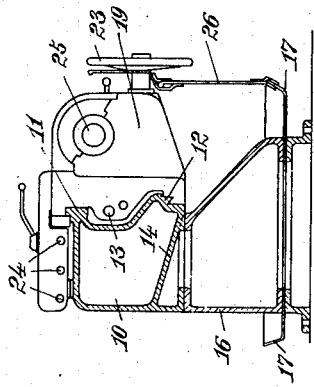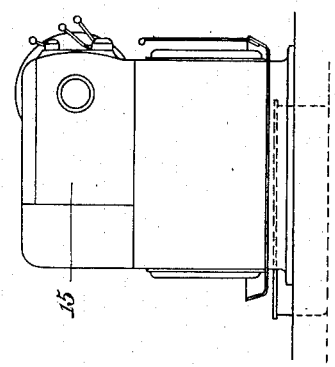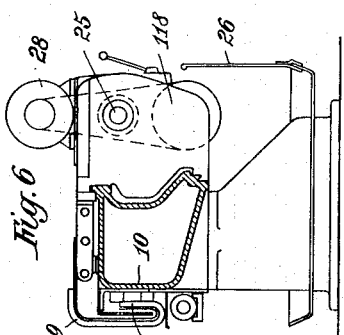

Dec. 30, 1941.  J. IRTENKAUF  2,268,214
BORING MACHINE
Filed Dec. 9, 1940  3 Sheets-Sheet 3

Inventor
JOSEF IRTENKAUF
BY
ATTORNEY

Patented Dec. 30, 1941

2,268,214

UNITED STATES PATENT OFFICE 2,268,214

BORING MACHINE

Josef Irtenkauf, Goppingen, Wurttemberg, Germany, assignor to Gebrüder Böhringer G. m. b. H., Goppingen, Wurttemberg, Germany Application December 9, 1940, Serial No. 369,212
In Germany November 24, 1939

6 Claims. (Cl. 77—3)

My invention relates to a boring machine, and more particularly, to a machine of the type in which the frame is constituted by a horizontal beam on which a tool support and holders for supporting the work piece and the boring tool are slidably guided.

In prior machines of this kind, the axis of the boring tool is located directly above the frame beam and this frame beam is open at its top and at its bottom to permit the chips cut out of the work piece to drop down through the frame into a receiving pan. Within the frame a feed spindle extends which cooperates with the tool support and serves the purpose to feed the tool into the revolving work piece. In order to prevent the chips from dropping directly on the work spindle, the tool support is normally provided with a sleeve covering and protecting the spindle. Such a sleeve, however, does not afford complete protection as it does not prevent the cutting liquid carrying dust and chips with it from soiling the spindle thus considerably increasing the wear thereof. The same applies to the guide way which is subject to contamination by the cutting liquid and, hence, suffers from excessive wear. These conditions considerably affect the accuracy of operation of the machine and reduce the life thereof.

A further disadvantage of machines of this kind is the insufficiency of the space below the frame in which the chips dropping from the work piece may collect. This space is limited, since the height of the machine measured from the floor to the center line of the work spindle must not exceed certain limits. Upon deduction from this height of the height of the frame and the distance of the work spindle center line therefrom, but little is left for the chip collecting space. An attempt to reduce the height of the frame by increasing its width would encumber the operation of the machine as it would keep the operator from getting sufficiently close to the work piece.

Experience has shown that if a modern hard metal tool is employed operating with a very high cutting speed, such large quantities of chips are produced within a short time as to completely fill and crowd the limited chip receiving space below the frame and to obstruct the passage way of the chips through the frame thus causing the chips to collect above the frame. Unless the chips are quickly removed, they will engage with the work piece and will be hurled away thereby thus endangering not only the operator of the machine but also other persons in the neighbourhood. The removal of the chips offers considerable difficulties on account of the poor accessibility of the passage way extending through the bed. Removing the chips without stopping the machine requires special labor.

The objects of my invention are to avoid the disadvantages of the prior machine explained hereinabove and to facilitate the removal of chips and to prevent them from collecting on the frame and from coming into contact with the feed spindle and the guide ways of the frame. To this end, I redesign the machine in such a way that its frame will be located laterally of the work spindle and of the tool thus leaving the space below the tool and its support and below the holders supporting the work and the tool unobstructed to receive the chips. Hence, a large space substantially coextensive with the length of the frame is available for receiving the chips. Moreover, the operator of the machine has an ideal access to the work and the tool to observe the operation and to remove the finished work piece and to chuck a new one. This is a material advantage over the prior art, as it facilitates and expedites the operation.

While I may provide the guide way on top of the frame as in prior machines, I prefer to provide it on its side wall adjacent to the work spindle. In this way, the width of the guide way may be considerably increased compared with the prior design. Such increase, however, is desirable in order to enhance the accuracy of operation. The guide way is thus located at a place where it will not be met by the chips and the cutting liquid dropping from the work piece and will not be contaminated thereby.

The chips accumulating below the work holder and tool holder may be readily pushed aside by the operator and thus be distributed within the large chip receiving space. Hence, the removal of chips will offer no difficulties even in event of a large output such as obtainable with hard metal tools.

Preferably, the beam constituting the frame of the machine is supported by feet embracing a space which supplements the space below the tool axis in a valuable manner.

An important advantage of my invention resides in the possibility of giving the frame beam a hollow but closed cross-sectional profile. Beams of this type have an excellent stiffness against torsional stresses which is a multiple of the stiffness of the prior beams having an open profile. This is a very important feature since the torque exerted by the rotating work on the boring tool is taken up by the frame beam and is transferred by the same to the head stock. It is, therefore, highly desirable that the torsional stiffness of the beam be increased to a maximum. This object is attained by giving the beam a closed profile. On the other hand, a given torsional stiffness may be attained with considerably thinner walls of the beam than it would be possible with an open profile as used prior to my invention.

Finally, my invention affords the possibility of designing the machine as a duplex machine comprised of a single frame beam which carries two sets of operating instrumentalities on either side. When duplex machines of this kind are arranged in the workshop one beside the other, the operator positioned between two machines may easily service the opposed instrumentalities of both machines, whereby the required labor is considerably reduced.

Two preferred embodiments of my invention are illustrated in the accompanying drawings in which Fig. 1 is an elevation of a simplex boring machine provided with a stationary boring tool, Fig. 2 is a plan view of the machine shown in Fig. 1, Fig. 3 is an end view shown from the left of Fig. 1, Fig. 4 is the section according to line 4—4 of Fig. 1, Fig. 5 is the section taken along line 5—5 of Fig. 1, Fig. 6 is a section similar to that of Fig. 1 through a modified embodiment of the invention in which the boring tool is driven, Fig. 7 is a perspective view of the machine shown in Figs. 1–5, and Fig. 8 is a cross-section corresponding to Fig. 4 taken through a duplex machine according to my invention.

The bed of the machine comprises a hollow box-shaped beam 10 having a completely closed cross-sectional profile. The top section and the bottom section of the front wall of this beam constitute guide ways 11 and 12. Between these guide ways the front wall has a concave profile to accommodate the horizontal feed spindle 13 supported by suitable bearings on the frame. The bottom wall 14 of the beam 10 is slightly inclined thus providing for a trapezoidal cross-section offering the advantage of a still higher torsional stiffness than obtainable with a rectangular cross-section.

The left end of the box-shaped beam 10 is rigidly connected or integral with the head stock frame 15. Moreover, the framed beam has a plurality of feet 16 spacing it from the floor about 20 inches.

The head stock frame in which the work spindle is journalled may be given a length and a width determined by the height of the frame beam 10 and by the position of the latter relative to the spindle axis 25. With such dimensions it will readily accommodate the main driving motor and the gearing for operating the work spindle and the pump feeding the cutting liquid to the tool.

On the guide ways 11 and 12 the tool support 18 is slidably guided. In this tool support, the boring tool B is rigidly secured. Between the tool support 18 and the head stock frame 15, there are mounted on the guide ways 11, 12 holders 19 and 20. The holder 20 is constituted by a collar surrounding and supporting the end of the rotating work piece W projecting towards the tool B. The holder 19 comprises a collar 21 surrounding and guiding the working end of the boring tool B and supporting control members 22 controlling the drive of the work spindle and controlling the slow cutting feed and the quick adjusting and returning feed of the tool support 18. Moreover, the slidable holder 19 is provided with a hand wheel 23 for its own manual adjustment and for that of the tool support 18. The control members 22 are adapted to rotate splined shafts 24 which are mounted one beside the other on top of the beam 10 extending longitudinally thereof and being journalled in suitable bearings. These shafts cooperate with the elements to be controlled thereby in a known manner that need not be described, since it does not form part of my invention.

On account of the arrangement described hereinabove, the tool support 18 and the two holders 19 and 20 project laterally from the frame in a cantilever fashion, as will appear from Figs. 4 and 5, thus leaving the space below them and below the boring tool B unobstructed and free to receive a large quantity of chips which are cut out of the work piece W and drop out of the hole that is bored into the same. This space is limited below by a pan 17 attached to the legs of the frame and extending between the same and forwardly and rearwardly thereof. Towards the front the chip receiving space is limited by a plate 26 readily detachably fixed to the forward rim of the pan 17 and extending upwardly to a level slightly below the work spindle and the tool as will best appear from Figs. 5, 6 and 7.

The chip receiving space is supplemented by the spaces 27 between the feet 16. Therefore, the operator may readily distribute the chips collecting below the work W pushing them to the right and to the left and into the spaces 27. In this manner, the chips will not interfere with the proper operation of the machine.

Figs. 4 and 5 show clearly that the operator has a close access to the work piece and to the tool to survey the operation and to chuck and detach the work piece to and from the work spindle. In this regard, the invention offers a considerable advantage over prior horizontal boring machines in which the tool spindle and the tool were mounted above the frame beam. Also, the guide ways 11 and 12 may be spaced apart a larger distance than in the prior machines in which the accessibility of the work piece would be affected by a large width of the guide way.

In Fig. 6 I have illustrated a modification of my invention in which the boring tool is driven. To this end, the tool support 118 carries a driving motor 28 to which current is supplied by a wiper 29 attached to the support 118 and sliding on a live rail 30 mounted on the frame beam. This live rail is located in sheltered position on the back of the beam 10. Similarly, the feed spindle 13 and the guide ways 11 and 12 are located in a sheltered position outside of the range of the chips.

Fig. 8 illustrates a duplex machine in which the frame beam 110 carries two sets of working instrumentalities, one set on each side. Each set comprises a tool support, a tool holder 19, or 119 respectively, and a work holder surrounding and supporting the work piece. The head stock is common to both sets of instrumentalities accommodating two work spindles. Hence, it will appear that the machine is fully symmetrically designed with regard to its central vertical longitudinal plane 31. In this way, the capacity of the machine is doubled without duplicating the weight of the machine. For, the frame beam of the duplex machine is but little heavier than that of the simplex machine illustrated in Figs. 1–7.

While I have described my invention with reference to specific embodiments thereof, I wish it to be understood that the invention is not limited to these embodiments but is capable of numerous modifications within the scope of the appended claims.

What I claim is:

1. A boring machine comprising a frame constituting a horizontal guide way, a tool support movable thereon and extending laterally of said frame, a boring tool mounted on said support and extending parallel to said guide way laterally of said frame, said frame being provided with a head stock coaxial with said support and said boring tool and including a work spindle, and holders for supporting said work and said boring tool slidably mounted on said guide way, the space below the work piece and the tool and laterally of the frame providing an unobstructed passage free of said frame through which the chips that form at the tool and work may pass.

2. A boring machine comprising a frame constituted by a horizontal beam having a lateral horizontal guide way, a tool support movable thereon and extending laterally of said beam, a boring tool mounted on said support and extending parallel to said guide way laterally of said beam, said frame being provided with a head stock coaxial with said support and said boring tool and including a work spindle, and holders for supporting said work and said boring tool slidably mounted on said guide way, the space below the work piece and the tool and laterally of the beam providing an unobstructed passage free of said beam through which the chips that form at the tool and work may pass.

3. A boring machine comprising a frame constituted by a hollow box-shaped horizontal beam having a closed cross-sectional profile and being provided with a lateral horizontal guide way, a tool support and holders for supporting a work piece and a boring tool being slidable on said guide way and extending laterally of said beam in a cantilever fashion, said boring tool being mounted on said support and extending parallel to said guide way laterally of said beam, and a head stock mounted on said frame coaxial with said support and said boring tool and including a work spindle carrying said work piece, the space below the work piece and the tool and laterally of the beam providing an unobstructed passage free of said beam through which the chips that form at the tool and work may pass.

4. A boring machine comprising a frame constituted by a horizontal beam provided with a longitudinal guide way, a tool support and holders for supporting a work piece and a boring tool being slidably mounted on said guide way and extending laterally from said beam in a cantilever fashion, said boring tool being mounted on said support and extending parallel to said beam, a head stock mounted on said beam coaxial with said tool support and said boring tool and including a work spindle carrying said work piece, said beam being provided with feet, the space below said work piece and said tool and laterally of the beam extending between said feet providing an unobstructed passage free of said beam through which the chips that form at the tool and work may pass.

5. A boring machine comprising a frame constituted by a hollow box-shaped horizontal beam having a concave side wall and being provided with a lateral horizontal guide way, a tool support and holders for supporting a work piece and a boring tool being slidable on said guide way and extending laterally of said beam in a cantilever fashion, said boring tool being mounted on said support and extending parallel to said guide way laterally of said beam, a feed spindle journalled on said beam and extending within the hollow of said concave side wall and cooperating with said tool support, and a head stock mounted on said frame coaxial with said support and said boring tool and including a work spindle carrying said work piece, the space below the work piece and the tool and laterally of the beam providing an unobstructed passage free of said beam through which the chips that form at the tool and work may pass.

6. A duplex boring machine comprising a horizontal beam provided with two longitudinal guide ways, two tool supports and two sets of holders on opposite sides of said beam, each tool support and set of holders being slidable on one of said guide ways and extending laterally of said beam in a cantilever fashion, said holders of each set being adapted to support a work piece and a boring tool, the boring tools being mounted on said supports and extending parallel to said guide ways laterally of said beam, and two head stocks mounted on said frame coaxial with said supports and said boring tools and including work spindles each carrying a work piece, the space below said work pieces and said tools and laterally of said beam providing an unobstructed passage free of said beam through which the chips that form at the tool and work may pass.

JOSEF IRTENKAUF.